United States Patent
Nygaard et al.

(10) Patent No.: US 8,954,566 B1
(45) Date of Patent: Feb. 10, 2015

(54) METHOD FOR COUNTING WITHOUT THE USE OF UNIQUE IDENTIFIERS

(75) Inventors: Carl Nygaard, Sunnyvale, CA (US); Dudley Carr, Seattle, WA (US)

(73) Assignee: Google Inc., Mountain View, CA (US)

( * ) Notice: Subject to any disclaimer, the term of this patent is extended or adjusted under 35 U.S.C. 154(b) by 648 days.

(21) Appl. No.: 13/025,023

(22) Filed: Feb. 10, 2011

(51) Int. Cl.
*G06F 15/16* (2006.01)

(52) U.S. Cl.
USPC ............................................. 709/224

(58) Field of Classification Search
CPC ................................................ G06F 15/16
USPC .............. 709/203, 217, 223, 224, 201, 248
See application file for complete search history.

(56) References Cited

U.S. PATENT DOCUMENTS

| | | | |
|---|---|---|---|
| 7,970,946 B1 * | 6/2011 | Djabarov et al. | 709/248 |
| 8,131,837 B1 * | 3/2012 | Nayfeh | 709/224 |
| 2004/0243704 A1 | 12/2004 | Botelho et al. | |
| 2006/0274753 A1 * | 12/2006 | Park et al. | 370/392 |
| 2009/0119062 A1 * | 5/2009 | Owens et al. | 702/176 |
| 2009/0182873 A1 | 7/2009 | Spalink et al. | |
| 2009/0254655 A1 * | 10/2009 | Kidwell et al. | 709/224 |
| 2010/0057843 A1 * | 3/2010 | Landsman et al. | 709/203 |
| 2010/0198826 A1 | 8/2010 | Petersen et al. | |
| 2012/0144016 A1 * | 6/2012 | Zhang et al. | 709/224 |

* cited by examiner

*Primary Examiner* — Vivek Srivastava
*Assistant Examiner* — Hermon Asres
(74) *Attorney, Agent, or Firm* — Sterne, Kessler, Goldstein & Fox PLLC

(57) ABSTRACT

Embodiments relate to determining the number of unique users of computer software without individually identifying users with a unique identification. In an embodiment, data elements are communicated from clients to a server. Each data element contains the number of days that have elapsed since the last communication from the client to the server. Based on the communicated data elements and the time and date at which each data element is received, the server can determine a count of unique users over a specified time period.

19 Claims, 5 Drawing Sheets

Using Unique Client Identifiers

| Day 0 | Day 1 | Day 2 | Day 3 | Day 4 | Day 5 | Day 6 |
|-------|-------|-------|-------|-------|-------|-------|
| A     | A     |       | B     |       |       | B     |
|       | B     |       |       |       |       | C     |
|       |       |       |       |       |       | C     |

FIG. 3A

| Using No Unique Client Identifiers | | | | | | |
|---|---|---|---|---|---|---|
| Day 0 | Day 1 | Day 2 | Day 3 | Day 4 | Day 5 | Day 6 |
| 1 | -1 | | 2 | | | 0 |
| | 1 | | | | | 8 |
| | | | | | | 3 |

FIG. 3B

METHOD FOR COUNTING WITHOUT THE USE OF UNIQUE IDENTIFIERS

BACKGROUND

1. Field

Embodiments generally relate to determining the number of users of computer software.

2. Background Art

To allocate resources properly in the client server model of computing, it is useful to determine how many unique clients are using a particular piece of computer software. Determining how many unique clients are using a particular piece of computer software may be performed in many ways. For example, the number of unique clients may be estimated by the number of downloads of the software. However, this number may not be accurate for various reasons. For example, the number of downloads may be too large if users download the software many times onto the same machine or too small if particular users obtain the software by other means. Also, tracking downloads does not allow the ability to determine if a client has ceased to use the particular software of interest. Thus, determining trends in the number of clients using the particular software cannot be accomplished.

The number of unique clients may also be estimated by assigning each client a unique identifier. Each client may communicate its unique identifier to a server which can aggregate the number of clients over a particular time period. For example, the server can count unique identifiers over a 30 day period to determine how many clients used the software in that period. However, some computer users are wary of their privacy and are reluctant to be identified in any way to third parties. Thus, using unique identifiers to count unique users may deter such users from using certain software.

BRIEF SUMMARY

In an embodiment, a method for counting users without relying on collecting identifying information from users or clients is disclosed. One or more data elements are received from a plurality of users. Each data element comprises a number of days or other length of time that has elapsed since the last communication from the client. Upon receiving each data element, a timestamp is associated with the data element. Using the data elements and associated timestamps, a count of unique clients over a specified time period may be determined. The start date or time of aggregation is determined by subtracting the days or other length of time in the specified time span from the end date or time for which the count of unique clients is being determined. For each data element, if the date or time determined by subtracting the days or other length of time since the last communication from the timestamp of the communication is earlier than the start date or time of aggregation, then the count of unique clients is incremented.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings.

FIG. 3A is an example of counting users using unique identifiers.

FIG. 3B is an example of counting users without the use of unique identifiers.

In the drawings, like reference numbers may indicate identical or functionally similar elements. The drawing in which an element first appears is generally indicated by the left-most digit in the corresponding reference number.

DETAILED DESCRIPTION

Embodiments relate to counting the number of clients or users of computer software. Determining the number of users or clients that have installed or currently use a particular piece of computer software is often useful to the manufacturers of such software, to network administrators, or to other parties. As stated above, knowledge of the number of clients may be vital to allocate physical resources such as computers and servers properly, as well as human resources such as customer support personnel. For example, manufacturers of web browsing software may utilize the number of users of such software or clients that have installed such software to allocate an appropriate number of update servers that allow users to retrieve software updates, such that individual servers are not overwhelmed by the number of clients seeking to update their web browser.

However, many computer users are concerned about the potential for third parties to view or collect personally identifying or other unique information about themselves. Thus, embodiments count the number of unique users or clients without the use of unique identifiers or other information that can be used to identify individual clients.

Embodiments utilize data elements communicated between one or more clients and a server. Data elements may represent the number of days, hours, minutes or other time period that has elapsed since the last communication from a client. Upon receipt of data elements, a server may associate the information stored in each data element along with the time and date a data element was received to determine an accurate count of users over a specified time period.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Method

Figure 1:
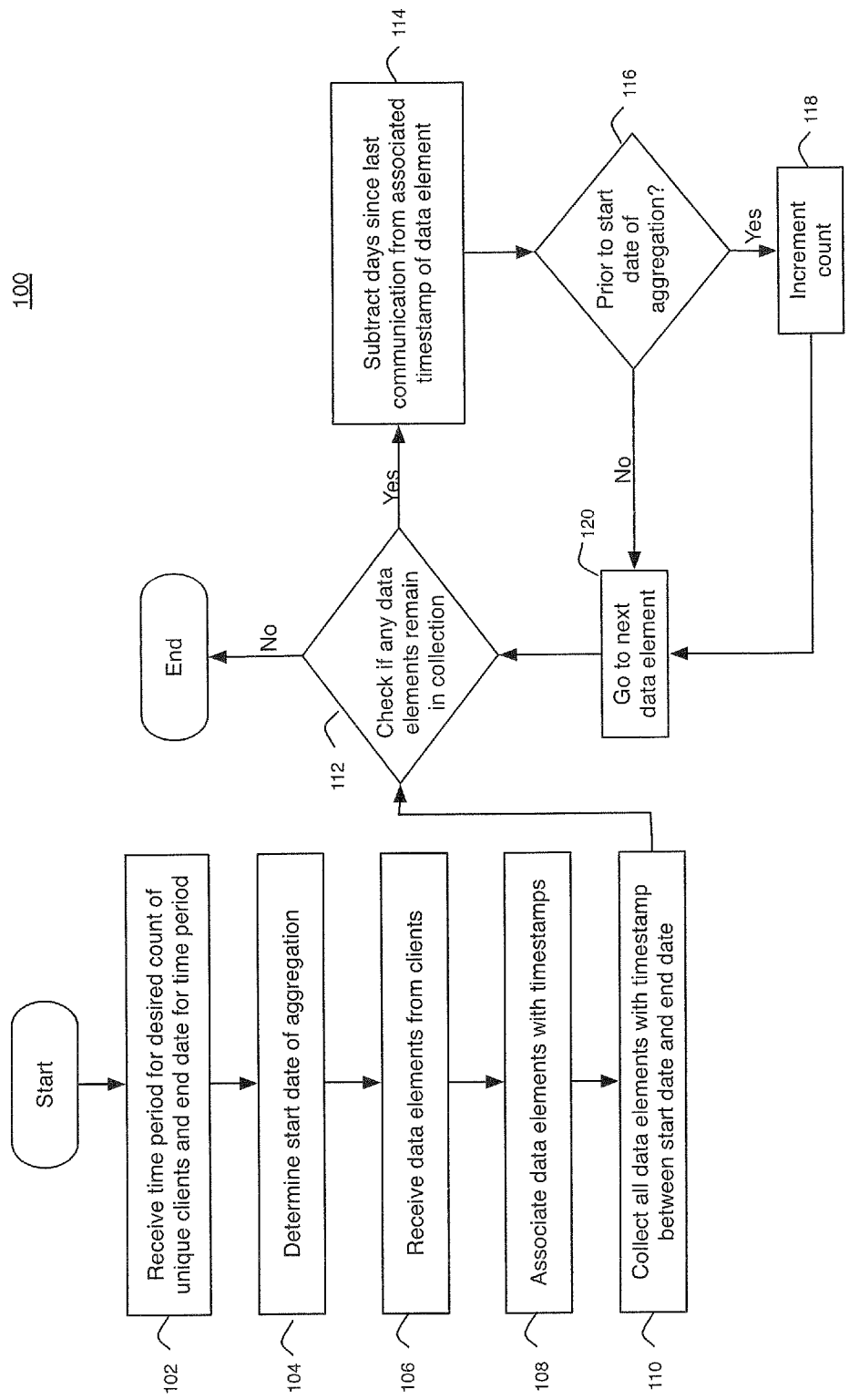
FIG. 1 is a flowchart of an exemplary method for counting unique users without reliance on collecting identifying information, in accordance with embodiments.

FIG. 1 is a flowchart of an exemplary method 100 for counting a number of unique users or clients without reliance on collecting identifying information, in accordance with an embodiment. In an example, method 100 may be utilized by a server to count a number of clients.

At step 102 of method 100, a time period over which to count clients over, and a desired end date, are received. For example, at the end of a particular week, a user, such as an employee of a software manufacturer, may wish to determine the number of unique users for that week. Thus, the end date may be, for example, Jan. 8, 2011, and the time period may be 7 days. Such a date and number of days may be chosen, for example and without limitation, by an administrative user.

At step 104, a start date of aggregation is determined. The start date may be determined by subtracting the number of days in the received time period from the received end date. In the above example, the start date may be determined to be Jan. 1, 2011.

At step 106, one or more data elements are received from clients. In an embodiment, each data element may contain the number of days that have elapsed since the last communication from the client. Clients may be, for example and without limitation, laptop computers, desktop computers, mobile devices, set-top boxes, or any other appropriate client device. For example, if the number of users of a particular piece of software, such as Google Chrome, is desired, the clients may be desktop and laptop computers. Similarly, if the number of users of the Android mobile operating system is desired, the clients may be mobile devices, such as cellular phones or smartphones. Data elements may be communicated via a network, such as a local area network, medium area network, or wide area network such as the Internet. Data elements may be received, for example and without limitation, at a server.

At step 108, as data elements are received, each data element is associated with a timestamp. For example, if a data element containing a value of "1" is received from a client at 10:23 AM on Jan. 2, 2011, that timestamp will be associated with the value of 1. Such a data element and associated timestamp may appear as (1, 102301022011), where the associated timestamp is formatted as a two digit hour, two digit minute, two digit day, two digit month, and four digit year. Similarly, a data element containing a value of "7" received at 2:03 PM on Jan. 5, 2011, may appear as (7, 140301052011).

At step 110, data elements with a timestamp falling between the start date of aggregation determined at step 104 and the end date of aggregation received at step 102 are collected. These data elements may be used to determine the number of unique clients over the desired time period. Data elements may be stored, for example and without limitation, in an array data structure or a database. The array or database may be implemented on a server.

At decision block 112, it is determined whether any data elements exist in the collection established at step 110. Data elements may not exist in the collection if they were not collected for the desired period, or for other reasons specific to the implementation of method 100. If data elements exist in the collection, the method proceeds to step 114.

At step 114, for a particular data element, the number of days that have elapsed since the last communication from the client is subtracted from the date of the associated timestamp of the communication (established at step 108) to determine a resultant date. In the example data element and associated timestamp (1, 102301022011), the number of days that have elapsed (1) is subtracted from the date of the associated timestamp (Jan. 2, 2011) for a resultant date of Jan. 1, 2011. In the example data element and associated timestamp (7, 140301052011), the number of days that have elapsed (7) is subtracted from the date of the associated timestamp (Jan. 5, 2011) for a resultant date of Dec. 29, 2010.

At decision block 116, it is determined whether the resultant date is prior to the start date of aggregation determined at step 104. In the first example above, the resultant date of Jan. 1, 2011 is not prior to the start date of aggregation (Jan. 1, 2011). Thus, the method proceeds to step 120.

At step 120, the method proceeds to the next data element in the collection. For example, if data elements are stored in an array, the method may increment to the next element of the array. If data elements are stored in a database, the method may proceed to the next row of the database.

If, at decision block 116, the resultant date determined at step 114 is prior to the start date of aggregation, the method proceeds to step 118. In the second example above, the resultant date is Dec. 29, 2010. Because the resultant date of Dec. 29, 2010 is prior to the start date of aggregation Jan. 1, 2011, the method proceeds to step 118. At step 118, the count of unique users is incremented, and the method proceeds to step 120, as detailed above.

After proceeding to the next data element at step 120, it is again determined at decision block 112 whether any additional data elements exist. If data elements do exist, the method proceeds to step 114 as detailed above. If data elements no longer exist in the collection, the method is complete, and the count of unique users may be presented to the administrative user, or communicated to one or more users.

In an embodiment, the number of days over which to count unique users may vary. For example, an administrator may wish to determine the number of unique users over a period of 1 day, 7 days, 14 days, 30 days, or any other number of days depending on the particular number sought.

Data elements may be received at a server. As stated above, data elements may be received via a local area network. For example, if method 100 is implemented in a small business to determine the number of users of a custom software package, data elements may be sent by individual clients or users to a server over a local area network. If method 100 is implemented to determine the number of users of a widely-available software package, data elements may be sent by individual clients over the Internet to one or more servers located across the world. Additionally, the server which receives data elements may further associate timestamps with each data element.

Users of a particular software package may be distributed across many different time zones. If the server is located in a different time zone, the count of unique users may not be accurate.

For example, consider a server determining the number of unique clients that may be located in the Pacific time zone, and a particular client that may be located in the Eastern time zone. A first communication from the client to a server may be sent at 1:05 AM EST on Jan. 2, 2010, containing a value of 1. A second communication sent at 4:05 AM EST on Jan. 2, 2010, may contain a value of 0, because a day has not elapsed since the last communication from the client.

Continuing the example, the server which receives data elements from clients may be located in the Pacific time zone. An administrative user may be interested in counting the number of unique clients on Jan. 2, 2010 from midnight PST to 11:59 PM PST. In accordance with step 108 of method 100, the first communication sent from the client may be associated with a timestamp of 10:05 PST on Jan. 1, 2010. The second communication sent from the client may be associated with a timestamp of 1:05 AM PST on Jan. 2, 2010.

The first communication from the client may not be collected, in accordance with step 110, since it falls outside of the desired time period, i.e., it is not a data element collected on Jan. 2, 2010 from midnight PST to 11:59 PM PST. The second communication may be collected, because it has a timestamp that falls on Jan. 2, 2010 in the Pacific time zone. Because the value of the data element of the second communication is 0, subtracting zero days from Jan. 2, 2010 will not result in a date prior to the start date of aggregation, and this communication will not cause the count of unique clients to be incremented.

However, because of the difference in time zones between the server and client, the particular client of this example is in fact a unique client for the time period specified. To the server, the communication is received at 1:05 AM PST on Jan. 2, 2010. If the client and server were located in the same time zone, the count of unique clients would be incremented as desired.

To compensate for the difference in time zones, sending the client's time stamp or time zone along with the data element may be utilized to count the correct data effectively. Then, the server which receives data elements may adjust the timestamps associated with each received data element to count unique clients correctly. However, this solution relies on collecting identifying information, including data specific to a particular client, which could potentially expose user demographics or other data that could be used to identify the particular client or user.

Thus, in an embodiment, to synchronize the time between the client and the server effectively and properly count users regardless of their location, the server may send to one or more clients the number of seconds since the start of the current day on the server (daystart_elapsed_seconds). This data may then be used by each client to determine, according to the time on the server, how many days, or other number of time periods, have elapsed since the previous communication.

To accomplish this, the received number of seconds since the start of the current day on the server (daystart_elapsed_seconds) is subtracted from the current time on the client. This number may be known as the seconds since the start of the last day (last_day_start), and may be calculated and stored by each individual client. The last_day_start value may represent a time in the previous day, and may be negative or positive.

In accordance with an embodiment, to determine the days that have elapsed since the last communication according to the server's time, each client may utilize the last_day_start value. The last_day_start value may be subtracted from the current time according to the client. This figure may then be divided by the number of seconds in a day (86,400), and rounded down to the nearest integer value, to determine the number of days that have elapsed since the last communication.

According to this embodiment, the above timeline may proceed as follows. The first communication sent from the client may still contain a value of 1, and be sent at 1:05 AM EST on Jan. 2, 2010 (10:05 PM PST on Jan. 1, 2010). In response, the server may return a value of 79,200, which is the number of seconds since midnight according to the server.

Using this value, the client may compute the last_day_start value to be −75,300 (3900-79,200). Thus, for the second communication, the number of days since the last communication may be determined as follows. The client's current time of 4:05 AM EST may be converted into seconds to be 14,400. Subtracting −75,300 from 14,400 results in a value of 89,700.

Thus, according to the above formula, the value of 89,700 is divided by the number of seconds in a day (86,400) and rounded down to the nearest integer to result in a value of 1. Thus, the second communication from the client to the server sent at 4:05 AM contains a value of 1.

Using this value, the count of unique clients on Jan. 2, 2010 according to the server in the Pacific time zone will correctly count this client as a unique client. In an embodiment, in response to each communication from the client, the server may send an updated daystart_elapsed_seconds value, to ensure that the server and all clients are effectively synchronized.

In an embodiment, data elements sent by each client may include multiple values. For example, one data element sent by each client may indicate the number of days since the client was last active. Thus, the server may be able to track the number of unique active users of the particular software. In an embodiment, data elements may report the number of days since the last roll call check of the particular software. A roll call check may indicate how many total or unique clients currently have the particular software package installed. These clients may or may not be actively using the software, but the data may still be important to track.

In an embodiment, data elements sent by each client may include data elements for multiple distinct software packages. For example, as stated above, an administrative user may wish to determine the number of users of the Google Chrome web browser. Additionally, the administrative user may wish to determine the number of users of the Google Earth geographical information systems software. Thus, in an embodiment, multiple data elements are sent by clients, where each data element is associated with a particular software package.

In an embodiment, if the number of days since the last communication is determined to be zero, a client may choose to effectively discard the data element so that it is not communicated to the server. This may be useful, for example, for limited bandwidth devices such as mobile telephones. Mobile telephone data transfer may be expensive, and it may be in a user's best interest to only transmit data that is absolutely necessary. Further, extraneous data received by a server may occupy valuable space on the server. Thus, in an embodiment, elements where the number of days since the last communication is equal to zero may be discarded by clients. Alternatively, upon receipt of a data element with a value of zero, a server may ignore the data element.

In an embodiment, the first communication from a client may contain a data element with a value of −1. A negative value may indicate that the communication is the first from the client, indicating that the particular software package is newly installed on the client device. Thus, in an embodiment, the count of unique clients over a specified time period may be incremented when a received data element contains a value of −1, since a new installation indicates the existence of a new client. In a further embodiment, in response to the first communication from a client, a server may send the daystart_elapsed_seconds value to the client.

In an embodiment, data may be exchanged between client and server in XML format. Thus, for example, data elements sent from each client to the server may appear as follows: <ping r="1" a="2"/>. A value following an "a" may indicate a number of days since a client was last active and sent an active check value. A value following an "r" may indicate a number of days since a client last sent a roll call check value.

Data elements sent from the server to the client, for example, the number of seconds since the start of the day, may also appear as XML data. For example, the number of seconds since the start of the last day on the server may be sent as <daystart_elapsed_seconds="59892"/>.

System

Figure 2:
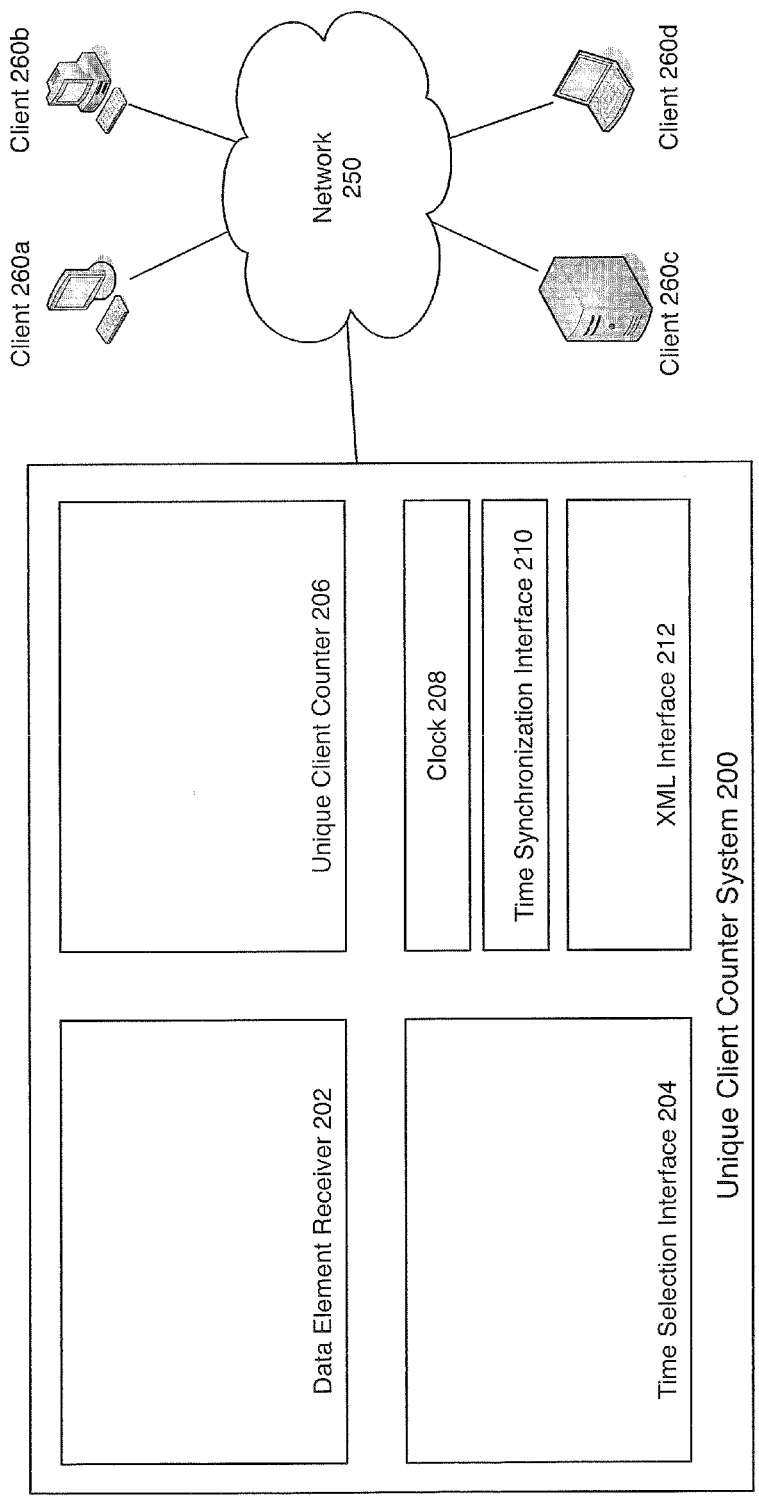
FIG. 2 is a diagram of a system configured to count unique users without reliance on collecting identifying information, in accordance with embodiments.

FIG. 2 is a diagram of a unique client counter system 200 configured to count unique clients in accordance with embodiments. Unique client counter system 200 includes a data element receiver 202. Data element receiver 202 may be configured to collect data elements from a plurality of clients, such as clients 260a-260d.

System 200 further includes a time selection interface 204. Time selection interface 204 may be configured to receive a desired end time or end date and time period for which to count unique clients. Time selection interface 204 may also be configured to determine a start time or start date of aggregation in accordance with step X of method 100.

System 200 may also include a clock 208. Clock 208 may be configured to operate in conjunction with data element receiver 202 to associate received data elements with a timestamp.

System 200 may also include a time synchronization interface 210. Time synchronization interface 210 may be configured to operate in conjunction with clock 208 to send the number of seconds that have elapsed from the start of the current day to one or more clients.

System 200 also may include XML interface 212. XML interface 212 may be configured to parse XML data elements received from a plurality of clients 260a-260d. Further, XML interface 212 may be configured to generate XML data elements and may operate in conjunction with time synchronization interface 210 to send XML formatted data to clients containing the number of seconds that have elapsed from the start of the current day.

System 200 and each of its components may be implemented in hardware, software, firmware, or any combination thereof. System 200 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

System 200 may be connected to a network 250 to facilitate communication with clients 260a-260d. Clients 260a-260d may be laptop computers, desktop computers, or other devices.

Further Examples and Embodiments

FIG. 3A is an example of using unique client identifiers to count unique clients over a seven day period. As seen in FIG. 3A, there are a total of three unique users (A, B and C) over the seven day period from Day 0 to Day 6.

FIG. 3B is an example of counting unique clients over a seven day period without the use of unique client identifiers, in accordance with embodiments described herein. In accordance with step 102 and 104, the time period for which the count of unique users is desired is Day 0 to Day 6. Each number of FIG. 3B represents a data element received in accordance with step 106. For example, the data element containing a value of "−1" may be received on Day 1. The data element may further have a timestamp associated with it in accordance with step 108. In accordance with step 110, all data elements received from Day 0 to Day 6 are collected.

Using the values provided in FIG. 3B, in accordance embodiments described herein, it can be determined that three unique clients exist over the seven day period.

For example, on Day 0, a value of "1" is received. In accordance with embodiments described herein, the resultant date would be determined to be Day −1, which would cause the count of unique clients to be incremented by 1, because −1 is less than 0.

Continuing on to Day 1, in accordance with an embodiment, the count of unique users may be incremented because of the data element containing a value of "−1", representing a new software installation. The data element containing a value of "1" received on Day 1 would not cause the count to be incremented, because the resultant date determined in accordance with embodiments would be Day 0, which is not prior to the start date of aggregation. Similarly, the data element containing a value of "2" received on Day 3 would not cause the count to be incremented.

Three values are received on Day 6. The data element containing a value of "0" on Day 6 indicates that a communication was received zero days ago. Thus, in accordance with an embodiment, the count of unique clients over a 7 day period will not be incremented. Similarly, for the value of "3" on Day 6, the count of unique clients over a 7 day period will not be incremented, because the resultant date will not be prior to the start date of aggregation. The "8" value on Day 6 indicates that a communication was received eight days ago. Thus, the resultant date, in accordance with an embodiment, would be Day −2, causing the count of unique clients to be incremented by 1. In total, the count of unique users may be determined to be 3, without using any unique identification.

Figure 4:
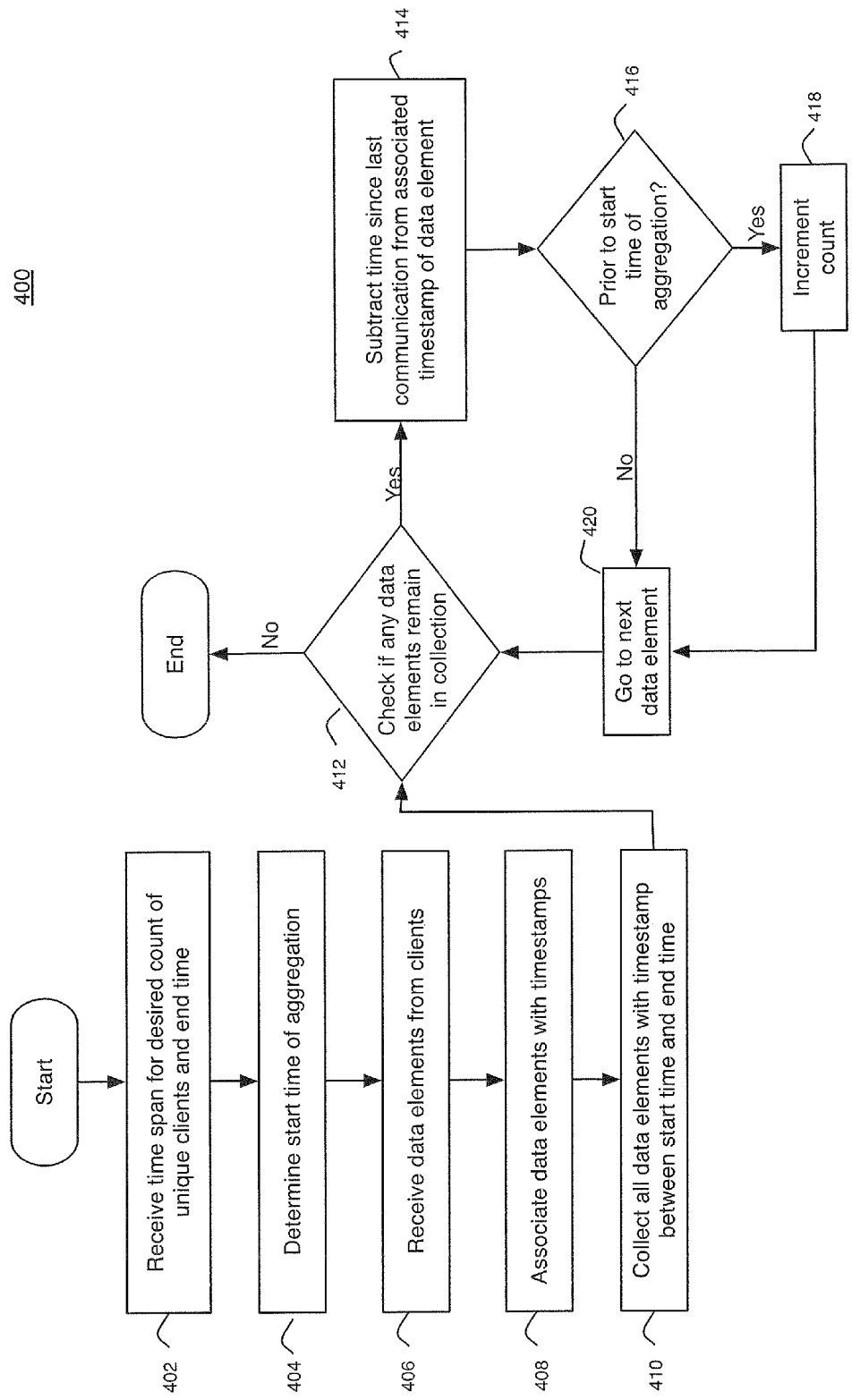
FIG. 4 is a flowchart of an exemplary method for counting unique users without reliance on collecting identifying information, in accordance with embodiments.

In a further embodiment, a count of unique clients may be determined for other time periods that may not be measured in days. For example, it may be useful to determine the number of unique clients over a period of 12 hours, or 36 hours. FIG. 4 is a flowchart of an exemplary method 400 for counting a number of unique users or clients without using unique identifiers, in accordance with an embodiment.

At step 402 of method 400, a time span over which to count unique clients and an end time are received. For example, an administrative user may wish to determine the number of unique users over a six-hour period ending at 6:00 PM on Jan. 2, 2011. At step 404, a start time of aggregation may be determined. In the example above, the start time of aggregation may be 12:00 PM on Jan. 2, 2011.

At step 406, one or more data elements are received from clients. In an embodiment, data elements sent by clients may indicate the number of hours or minutes that have elapsed since the last communication with a client. Data elements may be received, for example and without limitation, at a server.

At step 408, similar to step 108 of method 100, each data element is associated with a timestamp as it is received.

To count the number of unique clients over the desired time period, data elements with a timestamp falling between the start time determined at step 404 and the end time received at step 402 are collected. Data elements may be collected, for example and without limitation, into an array or database.

At decision block 412, the collection established at step 410 is checked to determine whether any data elements exist in the collection. For example, an array may be checked for the existence of elements, or a database may be checked to determine whether one or more rows exist. If data elements exist in the collection, the method proceeds to step 414. For example, two data elements may exist in the collection established at step 410. One data element may indicate 7 hours passed since the last communication from the client, and was received at 5:00 PM on Jan. 2, 2011. A second data element may indicate that 3 hours passed since the last communication from the client, and was received at 5:30 PM on Jan. 2, 2011.

At step 414, the time contained in each data element, for example the number of hours or minutes since the last communication from the client, is subtracted from the timestamp associated with the data element to determine a resultant time. For the first data element, the resultant time may be 10:00 AM on Jan. 2, 2011.

At decision block 416, it is determined whether the resultant time of step 414 is prior to the start time of aggregation. In the case of the first element, the resultant time of 10:00 AM Jan. 2, 2011 is prior to 12:00 PM Jan. 2, 2011. Thus, method 400 proceeds to step 418.

At step 418, the count of unique users is incremented. The method proceeds to step 420. At step 420, the method proceeds to the next data element in the collection. For example and without limitation, the method may select the next element in an array, or next row in a database.

Again, at decision bock 412, the collection is checked to determine whether elements exist in the collection. For example, if the collection is in an array data structure, it may be determined whether the method has proceeded to the last element in the array. Similarly, if the collection is in a database, it may be determined whether the method has proceeded to the last row in the database.

At step 414, the resultant time for the next element is determined. For the second data element, the resultant time may be 2:30 PM on Jan. 2, 2011.

At decision block 416, it is again determined whether the resultant time of step 414 is prior to the start time of aggregation. In the case of the second element, the resultant time of 2:30 PM Jan. 2, 2011 is not prior to 12:00 PM Jan. 2, 2011. Thus, method 400 proceeds to step 120, and the count of unique users is not incremented.

After proceeding to the next data element at step 420, it is again determined at decision block 412 whether any additional data elements exist. If data elements do exist, the method proceeds to step 414 as detailed above. If data elements no longer exist in the collection, the method is complete, and the count of unique users may be presented to the administrative user, or communicated to one or more users.

CONCLUSION

Although embodiments disclosed herein count unique users or clients without relying on collecting identifying information, embodiments may be used to count unique users or clients in systems or methods that do collect identifying information.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer implemented method of counting a number of unique clients over a specified time span without reliance on unique client identifiers, comprising:
   receiving, from one or more clients, one or more data elements, wherein each data element comprises a length of time that has elapsed since a previous communication of a data element from the client;
   determining a timestamp of each received data element; and
   determining from the received data elements and associated timestamps a count of unique clients over a received time span, wherein the count determining is implemented on a processing device and comprises:
   determining a start time of aggregation from the received time span, and
   for each received data element:
   subtracting the length of time since the previous communication from the associated timestamp of the communication to determine a resultant time and
   incrementing the count of unique clients when the resultant time is earlier than the start time of aggregation.

2. The computer implemented method of claim 1, wherein each data element comprises a length of time that has elapsed since the previous communication for an active check.

3. The computer implemented method of claim 1, wherein each data element comprises a length of time that has elapsed since the previous communication for a roll call check.

4. The computer implemented method of claim 1, wherein the received time span is seven days.

5. The computer implemented method of claim 1, further comprising:
   sending, from a server, to a plurality of clients, the number of seconds since the start of the current day on the server.

6. The computer implemented method of claim 1, wherein the steps of determining the timestamp of each received data element and determining a count of unique clients are performed by a server.

7. The computer implemented method of claim 1, wherein the data elements are in XML format.

8. The computer implemented method of claim 1, wherein data elements having a length of time that has elapsed since the previous communication equal to zero are discarded.

9. The computer implemented method of claim 1, further comprising incrementing the count of unique clients when the length of time that has elapsed since the previous communication is a negative number.

10. A client counter system for counting the number of unique clients over a specified time span without reliance on identifying information for any client, comprising:
- a data element receiver that receives data elements from a plurality of clients, wherein each data element comprises a length of time that has elapsed since a previous communication from the client, and that further associates each data element with a timestamp;
- a time selection interface that receives a time span to count unique clients over; and
- a unique client counter implemented on a processor which causes the processor to for each received data element:
  - subtract the length of time since the previous communication from the timestamp of the communication to determine a resultant time; and
  - increment the count of unique clients when the resultant time is earlier than the start time of aggregation.

11. The system of claim 10, further comprising:
- a clock that determines the number of seconds from the start of the current day; and
- a time synchronization interface that sends the number of seconds from the start of the current day to a plurality of clients.

12. The system of claim 11, further comprising an XML interface that parses XML structured data received from a plurality of clients.

13. The system of claim 12, wherein the XML interface generates XML-structured data containing the number of seconds from the start of the current day.

14. The system of claim 10, wherein the data element receiver further discards data elements having a length of time that has elapsed since the previous communication from the client equal to zero.

15. The system of claim 10, wherein the unique client counter further increments the count of unique clients when a data element is received having a length of time that has elapsed since the previous communication from the client equal to a negative number.

16. The system of claim 10, wherein each data element comprises a length of time that has elapsed since the previous communication for an active check.

17. The system of claim 10, wherein each data element comprises a length of time that has elapsed since the previous communication for a roll call check.

18. A computer implemented method of counting unique users, comprising:
- receiving one or more data elements indicating a length of time that has elapsed since a previous communication;
- subtracting the length of time since the previous communication from the current time to determine a timestamp;
- associating the received data elements with the timestamp;
- determining a count of unique users over a time span, wherein the count determining is implemented on a processing device and comprises:
  - incrementing a count of unique users when a time determined by the received data element and associated timestamp is prior to a start time of the time span.

19. The computer implemented method of claim 1, wherein the receiving comprises:
- receiving the one or more data elements from the one or more clients without an identifier associated with the client from which the data elements are received.

* * * * *